US009827965B2

(12) United States Patent
Kolarsky et al.

(10) Patent No.: US 9,827,965 B2
(45) Date of Patent: Nov. 28, 2017

(54) METHOD FOR OPERATING A REGENERATIVE BRAKE SYSTEM OF A VEHICLE, CONTROL DEVICE FOR A REGENERATIVE BRAKE SYSTEM OF A VEHICLE, AND REGENERATIVE BRAKE SYSTEM (71) Applicant: Robert Bosch GmbH, Stuttgart (DE)

(72) Inventors: Jens Kolarsky, Bietigheim/Bissingen (DE); Michael Kunz, Steinheim an der Murr (DE); Stefan Strengert, Stuttgart (DE); Herbert Vollert, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/411,342

(22) PCT Filed: May 3, 2013

(86) PCT No.: PCT/EP2013/059222
§ 371 (c)(1),
(2) Date: Dec. 24, 2014

(87) PCT Pub. No.: WO2014/000928
PCT Pub. Date: Jan. 3, 2014

(65) Prior Publication Data
US 2015/0197230 A1    Jul. 16, 2015

(30) Foreign Application Priority Data

Jun. 29, 2012    (DE) .................. 10 2012 211 278

(51) Int. Cl.
*B60L 7/18*        (2006.01)
*B60T 13/68*      (2006.01)
(Continued)

(52) U.S. Cl.
CPC .............. *B60T 13/686* (2013.01); *B60L 7/18* (2013.01); *B60T 1/10* (2013.01); *B60T 7/042* (2013.01);
(Continued)

(58) Field of Classification Search
CPC ...... B60T 1/10; B60T 2270/604; B60T 7/042; B60T 13/745; B60T 13/662;
(Continued)

(56) References Cited

U.S. PATENT DOCUMENTS 8,632,136 B2 *   1/2014   Nozawa ................ B60T 13/586
                                                         303/115.2
8,892,327 B2 *  11/2014   Hachtel ................ B60T 8/3265
                                                         701/32.1
(Continued)

FOREIGN PATENT DOCUMENTS

CN          1978238 A       6/2007
DE          196 04 134      7/1997
(Continued)

OTHER PUBLICATIONS

International Search Report for PCT/EP2013/059222, dated Jul. 23, 2013.

*Primary Examiner* — Truc M Do
(74) *Attorney, Agent, or Firm* — Norton Rose Fulbright US LLP; Gerard Messina (57)    ABSTRACT A method for operating a regenerative braking system of a vehicle includes: applying control to at least one valve of a brake circuit, before and/or during operation of a generator of the braking system, so that brake fluid is displaced out of a brake master cylinder and/or out of the at least one brake circuit into at least one reservoir volume; defining a target force difference variable regarding a booster force exerted by a brake booster in consideration of at least one of a
(Continued)

generator braking torque information item, a brake master cylinder pressure variable, and an evaluation variable derived from at least the generator braking torque information item or the brake master cylinder pressure variable; and controlling the brake booster in consideration of the defined target force difference variable.

10 Claims, 6 Drawing Sheets

(51) Int. Cl.
| | |
|---|---|
| *B60T 1/10* | (2006.01) |
| *B60T 7/04* | (2006.01) |
| *B60T 13/14* | (2006.01) |
| *B60T 13/66* | (2006.01) |
| *B60T 13/74* | (2006.01) |
| *B60T 17/22* | (2006.01) |
| *B60T 8/32* | (2006.01) |
| *B60T 8/48* | (2006.01) |
| *B60T 13/58* | (2006.01) |

(52) U.S. Cl.
CPC .......... *B60T 8/3265* (2013.01); *B60T 8/4872* (2013.01); *B60T 13/146* (2013.01); *B60T 13/58* (2013.01); *B60T 13/662* (2013.01); *B60T 13/745* (2013.01); *B60T 17/221* (2013.01); *B60T 2270/604* (2013.01); *B60Y 2300/89* (2013.01)

(58) Field of Classification Search
CPC ................ B60T 13/586; B60T 13/686; B60T 2270/402; B60T 8/267; B60T 8/321; B60W 30/18127; B60W 10/184; B60W 2510/244; B60W 30/18109; B60W 10/11; B60W 10/188; B60W 20/00; B60W 2510/081
See application file for complete search history.

(56) References Cited

U.S. PATENT DOCUMENTS

| | | | | |
|---|---|---|---|---|
| 9,308,897 | B2* | 4/2016 | Watanabe | B60T 1/10 |
| 9,544,487 | B2 | 1/2017 | Bauer et al. | |
| 2001/0006306 | A1* | 7/2001 | Kagawa | B60T 8/367 |
| | | | | 303/20 |
| 2002/0023437 | A1* | 2/2002 | Kanazawa | B60T 11/20 |
| | | | | 60/562 |
| 2002/0026795 | A1* | 3/2002 | Nishii | B60T 11/22 |
| | | | | 60/547.1 |
| 2003/0173826 | A1* | 9/2003 | Tazoe | B60L 7/26 |
| | | | | 303/152 |
| 2005/0269875 | A1* | 12/2005 | Maki | B60L 7/26 |
| | | | | 303/152 |
| 2006/0004507 | A1* | 1/2006 | Teslak | B60K 6/12 |
| | | | | 701/69 |
| 2007/0228823 | A1* | 10/2007 | Kokubo | B60T 7/22 |
| | | | | 303/155 |
| 2007/0267915 | A1* | 11/2007 | Shimada | B60K 6/44 |
| | | | | 303/122 |
| 2008/0106143 | A1* | 5/2008 | Yazaki | B60L 7/18 |
| | | | | 303/13 |
| 2008/0182712 | A1* | 7/2008 | Kira | B60K 6/26 |
| | | | | 477/7 |
| 2009/0045672 | A1 | 2/2009 | Nishino et al. | |
| 2009/0294629 | A1 | 12/2009 | Drotleff et al. | |
| 2010/0187901 | A1* | 7/2010 | Sonoda | B60L 7/10 |
| | | | | 303/11 |
| 2011/0066345 | A1* | 3/2011 | Nasu | B60L 7/24 |
| | | | | 701/70 |
| 2011/0251769 | A1* | 10/2011 | Weiberle | B60T 1/10 |
| | | | | 701/70 |
| 2011/0304198 | A1* | 12/2011 | Cottrell | B60L 7/26 |
| | | | | 303/2 |
| 2012/0158266 | A1* | 6/2012 | Miyazaki | B60W 10/18 |
| | | | | 701/70 |
| 2012/0160619 | A1* | 6/2012 | Isono | B60T 13/165 |
| | | | | 188/106 P |
| 2012/0212044 | A1* | 8/2012 | Nakamura | B60T 7/042 |
| | | | | 303/9.62 |
| 2012/0265419 | A1* | 10/2012 | Kim | B60L 3/104 |
| | | | | 701/71 |
| 2012/0325573 | A1* | 12/2012 | Miller | B60L 7/24 |
| | | | | 180/282 |
| 2013/0049450 | A1* | 2/2013 | Kunz | B60T 8/267 |
| | | | | 303/3 |
| 2013/0062932 | A1* | 3/2013 | Yagashira | B60T 8/442 |
| | | | | 303/3 |
| 2013/0181506 | A1* | 7/2013 | Weiberle | B60T 7/042 |
| | | | | 303/3 |
| 2013/0199364 | A1* | 8/2013 | Weiberle | B60L 7/18 |
| | | | | 92/139 |
| 2013/0297170 | A1* | 11/2013 | Kunz | B60T 8/267 |
| | | | | 701/70 |
| 2014/0032071 | A1* | 1/2014 | Strengert | B60L 3/0023 |
| | | | | 701/70 |
| 2014/0333123 | A1* | 11/2014 | Kunz | B60L 7/26 |
| | | | | 303/3 |
| 2015/0130264 | A1* | 5/2015 | Isono | B60T 8/17 |
| | | | | 303/3 |

FOREIGN PATENT DOCUMENTS

| | | |
|---|---|---|
| DE | 10 2009 005937 | 7/2010 |
| DE | 10 2009 002359 | 10/2010 |
| DE | 10 2010 002272 | 8/2011 |
| DE | 10 2010 002406 | 9/2011 |
| DE | 10 2010 040854 | 3/2012 |
| DE | 10 2011 083305 | 5/2012 |
| WO | WO 2010/006996 | 1/2010 |
| WO | WO 2010/069679 | 6/2010 |
| WO | WO 2011/020691 | 2/2011 |
| WO | 2012/028700 A1 | 3/2012 |

* cited by examiner

METHOD FOR OPERATING A REGENERATIVE BRAKE SYSTEM OF A VEHICLE, CONTROL DEVICE FOR A REGENERATIVE BRAKE SYSTEM OF A VEHICLE, AND REGENERATIVE BRAKE SYSTEM

BACKGROUND OF THE INVENTION

1. Field of the Invention

The invention relates to a control device and a method for operating a regenerative braking system of a vehicle. The invention furthermore relates to a regenerative braking system for a vehicle.

2. Description of the Related Art

Published German patent application document DE 196 04 134 A1 describes a method and an apparatus for controlling a braking system of a motor vehicle having an electrical drive system. Upon deceleration of the vehicle using the electrical drive system for simultaneous charging of a battery, the hydraulic braking torque exerted by the at least one wheel brake cylinder of the hydraulic braking system on at least one wheel is said to be reduced or deactivated despite an actuation of the brake pedal. For this, the pressure medium displaced out of the brake master cylinder to the wheel brakes by the actuation of the brake pedal is said to be counteracted by the fact that as a result of opening the wheel outlet valves of the hydraulic braking system, the pressure medium displaced out of the brake master cylinder is transferred via the at least one wheel brake cylinder into at least one reservoir chamber. A regenerative deceleration operation performed by the electrical drive system is said thereby to be blendable.

BRIEF SUMMARY OF THE INVENTION

The present invention makes possible a braking system that can execute both force blending and volume blending during a braking operation. The term "force blending" expresses an operation with which the driver, during actuation of the brake actuation element, for example the brake pedal, in particular in a context of exclusively regenerative braking (i.e. braking with a hydraulic braking torque of the at least one wheel brake cylinder equal to zero), is not aware that no brake pressure is present in the brake master cylinder and that therefore no brake master cylinder counterforce or brake master cylinder feedback force is being exerted on the brake actuation element. The driver thus experiences the standard pedal feel even during exclusively regenerative braking. The standard brake actuation feel also remains perceptible to the driver upon a changeover from exclusively regenerative braking to exclusively hydraulic braking, even though the brake master cylinder pressure and thus the brake master cylinder counterforce or brake master cylinder feedback force is (significantly) increasing. The braking system that can be implemented by way of the present invention is capable, however, of maintaining a sum, exerted on the brake actuation element, of the brake master cylinder counterforce or brake master cylinder feedback force and the boost force of the brake booster which, independently of an operating instance of the braking system, is (almost) constant and is comparable to a brake actuation feel of a conventional braking system.

The term "volume blending" can refer to an operation with which the volume of brake fluid displaced by a driver's actuation of the brake actuation element is not conveyed into the at least one wheel brake cylinder (wheel brake caliper) but instead is stored in the at least one reservoir volume. A buildup of or increase in the hydraulic braking torque of the at least one wheel brake cylinder can thereby be prevented despite the actuation of the brake actuation element by the driver. The target braking torque requested by the driver by way of the actuation of the brake actuation element can thus be used (in particular, entirely) to activate the generator, without excessive deceleration of the vehicle as compared with the driver's braking request. Volume blending thus allows the energy consumption and pollutant emissions of the vehicle to be reduced. If the generator braking torque decreases during a braking operation, for example because a vehicle battery is completely charged and/or because a present vehicle speed is below a minimum generator utilization speed, a return delivery of the volume of brake fluid displaced into the at least one reservoir volume back into the wheel brake cylinders or wheel brake calipers can be effected thanks to volume blending. The hydraulic braking torque of the at least one wheel brake cylinder can thereby be built up or increased in such a way that the target braking torque of the vehicle specified by the driver can reliably be complied with despite a decrease over time in the generator braking torque.

The present invention is notable for cost-efficient enhancement of a single-circuit system. The braking system achievable with the present invention exhibits an advantageously high regenerative efficiency and offers good braking smoothness for the driver despite the simultaneously executed blending of the time-varying generator braking torque.

The increase in regenerative efficiency which is implemented by way of the present invention is also based on the fact that the braking system implemented by way of the present invention assists the driver with the task of modulation in the event of an interruption in the relevant regenerative braking torque. The limitation, usual in the existing art, of the regenerative braking torque to a maximum braking torque that can be blended in by the driver him- or herself is thus omitted.

The advantageous blending, achievable by way of the present invention, of the generator braking torque is moreover not limited to a jump-in range of the brake booster. An appreciable enhancement of functionality and increase in regenerative efficiency are associated therewith.

The braking system achievable by way of the present invention is not limited the use of a brake booster embodied as a vacuum brake booster. The achievable braking system is thus no longer dependent on a vacuum supply. The braking system can thus advantageously also be used in an electric and hybrid vehicle that either has no internal combustion engine or uses an internal combustion engine that is at least intermittently deactivated. Because the brake booster is not supplied with vacuum, the braking system that is implemented is no longer reliant on the presence or the frequent operation of an internal combustion engine.

The invention realizes a braking system that represents an advantageous combination of an (electromechanical) brake booster and an ESP system. It eliminates the disadvantage of a limited regenerative efficiency of standard braking systems, without at the same time requiring complete decoupling of the driver from the braking system. Despite the advantageous blendability of the braking system in order to adapt the hydraulic braking torque of the at least one brake cylinder to the time-varying generator braking torque, the driver thus also has the ability to brake directly into the braking system. It is simultaneously possible to achieve good regenerative efficiency with limited additional cost.

The invention creates a braking system that represents an enhanced single-circuit system. The enhancement allows the disadvantage of the greatly limited regenerative efficiency of known single-circuit systems to be eliminated without requiring, for enhancement, a large amount of work as compared with a conventional braking system. It is thus possible by way of the present invention to achieve sufficient regenerative efficiency for a braking system economically, or with minimal additional cost.

What can be achieved with the present invention in particular is a braking system having an advantageous regenerative efficiency, the use of which is not limited to a vehicle having an axle-based brake circuit configuration. The control apparatus according to the present invention and the corresponding method are instead advantageously usable for a vehicle having an X-type brake circuit configuration, in which the wheels associated with one shared brake circuit are disposed on different vehicle axles. A vehicle having an X-type brake circuit configuration can also be described as one in which the wheels associated with one shared brake circuit are disposed diagonally on the vehicle. The present invention thus represents an advantageous enhancement of a regenerative braking system for vehicles having an X-type brake circuit configuration.

As compared with the existing art, the control apparatus according to the present invention and the corresponding method also offer blending of a generator braking torque in a context of comparatively heavy braking of the vehicle. As will be discussed below in further detail, faster charging of a vehicle battery can be effected thanks to the enhancement of the usability of the blending function. The present invention thus advantageously contributes to reducing energy consumption and exhaust emissions when driving a vehicle.

DETAILED DESCRIPTION OF THE INVENTION

Figure 1:
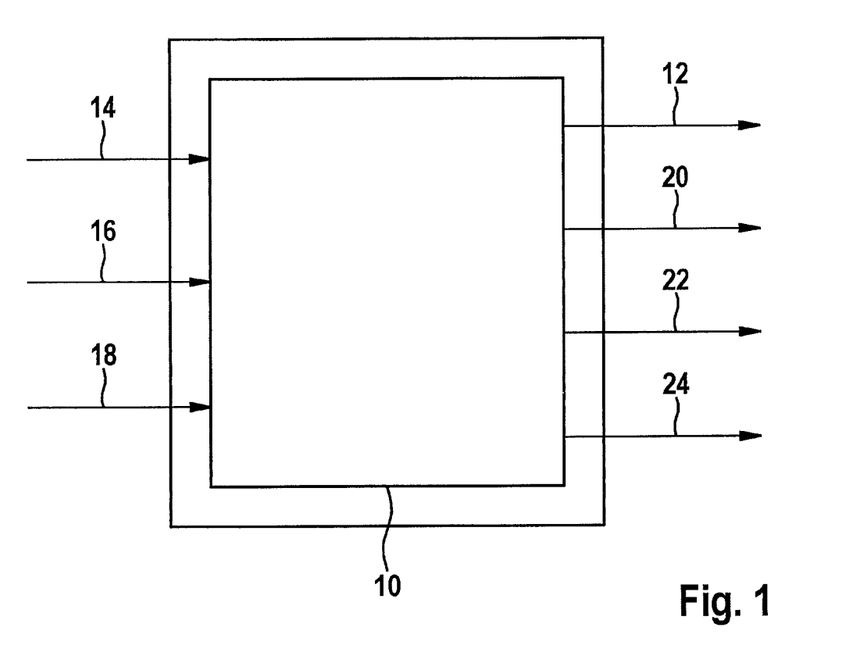
FIG. 1 schematically depicts an embodiment of the control apparatus.

FIG. 1 schematically depicts an embodiment of the control apparatus.

The control apparatus schematically depicted in FIG. 1 is designed to control components of a braking system (not depicted) of a vehicle. The possible design of the components of the braking system will be discussed in more detail with reference to the further Figures.

The control apparatus schematically depicted in FIG. 1 has a control application device 10 with which at least one valve of a brake circuit of the braking system is controllable into an at least partly opened state by outputting a valve control signal 12, before and/or during operation of a generator of the braking system, so that brake fluid is displaceable via the at least partly opened at least one valve out of a brake master cylinder of the braking system and/or out of the at least one brake circuit into at least one reservoir volume of the respective brake circuit. A buildup of brake pressure in at least one wheel brake cylinder attached to the respective brake circuit is thus preventable despite an actuation of a brake actuation element, for example a brake pedal, disposed on the brake master cylinder. The braking effect, suppressed in this manner, of the at least one wheel brake cylinder can thus be used for regenerative operation of the generator. This ensures the advantageous high regeneration efficiency already referred to above.

In order to apply control in the manner described here to the at least one valve, control application device 10 can evaluate a variety of signals or information items furnished by at least one sensor and/or at least one electronic control system, for example a generator braking torque information item 14 regarding a generator braking torque exerted or to be exerted by a generator, a measured or estimated brake master cylinder pressure variable 16 that is furnished, and/or further information signals 18. Information signals 18 can encompass, for example, at least one variable regarding a total target braking torque specified by the driver, regarding a maximally implementable generator-producible braking torque, regarding a charge state of a vehicle battery, and/or regarding a present vehicle speed. Control application device 10 can likewise be designed to receive a target generator braking torque signal furnished as a generator braking torque information item 14, and then to apply control to the generator in such a way that the generator braking torque to be exerted is complied with.

Control application device 10 is designed, for example, to detect, on the basis of generator braking torque information item 14, an increase in the generator braking torque that is exerted or to be exerted. The range of embodiment of control application device 10 is not limited, however, to this exemplifying embodiment.

The at least one valve control signal 12 can be, for example, a supply current signal of the at least one valve. Instead of a supply current signal, however, a different signal can also be furnished as the at least one valve control signal 12 to the at least one valve. (The at least one valve can be embodied selectably as a zero-current-open or zero-current-closed valve.)

The at least one valve is controllable by way of valve control signal 12 into an at least partly opened state so that brake fluid is displaceable via the at least partly opened at least one valve out of the brake master cylinder of the braking system and/or the at least one brake circuit of the braking system into at least one reservoir volume of the braking system. For example, control application device 10 can be designed to apply control to at least one wheel outlet valve or at least one high-pressure switching valve constituting the at least one valve. It is thereby possible, for example, to ensure that brake fluid is displaceable via the at least partly opened at least one wheel outlet valve or the at least partly opened at least one high-pressure switching valve into at least one low-pressure reservoir chamber constituting the at least one reservoir volume. The control apparatus described here is not limited, however, to an embodiment of the at least one valve as a wheel outlet valve or high-pressure switching valve, and/or of the at least one reservoir volume as a reservoir chamber or low-pressure reservoir chamber.

As will be discussed in more detail below, by application of control to the at least one valve by way of valve control signal 12, the hydraulic braking torque of the at least one wheel brake cylinder can be reduced, despite an actuation of the brake actuation element of the braking system by a driver, in such a way that a total target braking torque specified by the driver is reliably complied with even in the context of an increase in the generator braking torque. In particular, by way of the displacement of the volume of brake fluid into the at least one reservoir volume, a buildup of brake pressure in the at least one wheel brake cylinder can be (almost) suppressed. The control apparatus can thus advantageously be used to keep the hydraulic braking torque so low, despite the actuation of the brake actuation element by the driver, that rapid recharging of a vehicle battery, and thus low energy consumption and reduced pollutant emissions by the vehicle equipped with the braking system, are achievable by frequent utilization of the generator in order to exert a relatively high generator braking torque. (This advantage of the control apparatus has already been expressed above using the term "volume blending.")

Control application device 10 is additionally designed to define, in consideration of generator braking torque information item 14 regarding the generator braking torque exerted or to be exerted by the generator, of the measured or estimated brake master cylinder pressure variable 16 that is furnished, and/or of an evaluation variable derived at least from generator braking torque information item 14 or from brake master cylinder pressure variable 16, a target force difference variable regarding a booster force that can be exerted by a brake booster of the braking system. In consideration of the target force difference variable that is defined, at least one brake booster control signal 20 can be outputted to the brake booster. The brake booster, or its electronic control system, can have control applied to it by way of brake booster control signal 20 in such a way that the booster force can be varied by an amount equal to an actual force difference corresponding to the target force difference variable.

The evaluation variable derived at least from generator braking torque information item 14 can encompass, for example, an estimate of a volume of brake fluid displaced into the at least one reservoir volume by the opening of the at one valve. This kind of embodiment of control application device 10 is, however, optional.

Brake fluid displacement via the at least one opened valve (as a result of the blended varying generator braking torque) can bring about a change in the brake master cylinder pressure (internal pressure in the brake master cylinder). This can cause a variation in a brake master cylinder counterforce, which is exerted on at least one piston (primary piston or plunger piston) movable into the brake master cylinder, on the brake actuation element, and/or on at least one connecting device disposed between the piston and the brake actuation element, for example an input plunger or a mechanism of a brake booster. Control application device 10 is preferably designed to define the target force difference variable in such a way that the change in the brake master cylinder counterforce can be compensated for by way of a change in the booster force. This can be achieved by defining the target force difference variable so that a corresponding change in the booster force corresponds to the change in the brake master cylinder counterforce. In particular, the target force difference variable can be definable in such a way that the at least one piston (primary piston or plunger piston), the brake actuation element, and/or the at least one connecting device remain in their positions despite the change in the brake master cylinder counterforce triggered by the displacement of brake fluid. If the generator braking torque increases over time, control application device 10 is preferably designed to define a decrease in the booster force corresponding to a reduction in the brake master cylinder counterforce. Correspondingly, in the context of an decrease over time in the generator braking torque the booster force can be indirectly redefined by the control application device 10 so that the booster force of the brake booster can be raised in accordance with the increase in the brake master cylinder counterforce.

Control application device 10 be designed, for example, to take into account a braking torque/counterforce characteristic curve, a volume/counterforce characteristic curve, and/or a brake master cylinder pressure/counterforce characteristic curve when defining the target force difference variable. In particular, the method steps described in more detail below can be executable by way of control application device 10.

Reducing or raising the booster force makes it possible to ensure that upon actuation of the brake actuation element, for example a brake pedal, the driver perceives a standard brake actuation feel despite blending of the time-varying generator braking torque and the brake fluid volume displaced for that purpose. (In addition to the blendability of the time-varying generator braking torque, the control apparatus thus also ensures brake actuation smoothness, which is expressed above using the term "force blending.")

In an advantageous refinement, control application device 10 can additionally be designed to detect a reduction in the generator braking torque on the basis of generator braking torque information item 14 and/or one of information signals 18. Control application device 10 is optionally designed so that, upon a reduction in the generator braking torque exerted by the generator and/or upon a deactivation of the generator, it applies control to at least one pump of the respective brake circuit by way of at least one pump activation signal 22 so that brake fluid is pumpable by way of the at least one pump out of the at least one reservoir volume into at least one wheel brake cylinder of the braking system. The total target braking torque requested by the driver can thus be reliably complied with, despite the decrease over time in the total generator braking torque, by elevating the hydraulic braking torque of the at least one wheel brake cylinder.

Control application device 10 can furthermore additionally be designed to output, during operation of the at least one pump for pumping brake fluid out of the at least one reservoir volume into the at least one wheel brake cylinder, at least one closing signal 24 to at least one switchover valve (not depicted) of the braking system. The at least one switchover valve is controllable into a closed state by way of the at least one closing signal 24. It is thereby possible to prevent the driver from experiencing a recoil during actuation of the brake actuation element due to activation of the at least one pump.

In an advantageous refinement, after termination of operation of the at least one pump for pumping brake fluid out of the at least one reservoir volume into the at least one wheel brake cylinder, or after return delivery has occurred, the at least one switchover valve (preferably embodied to be continuously adjustable) can be controlled, by way of the control apparatus or control application device 10, to open slowly. Any pressure differences can thereby be compensated for during opening of the at least one switchover valve. For advantageous adaptation of the booster force, brake master cylinder pressure variable 16 can be continuously evaluated even during this slow control or opening of the at least one switchover valve.

The control apparatus can additionally be designed to perform the functions explained below with reference to the braking system or to the method steps described below. Reference is therefore made to the text passages below regarding advantageous refinements of the control apparatus.

Figure 2:
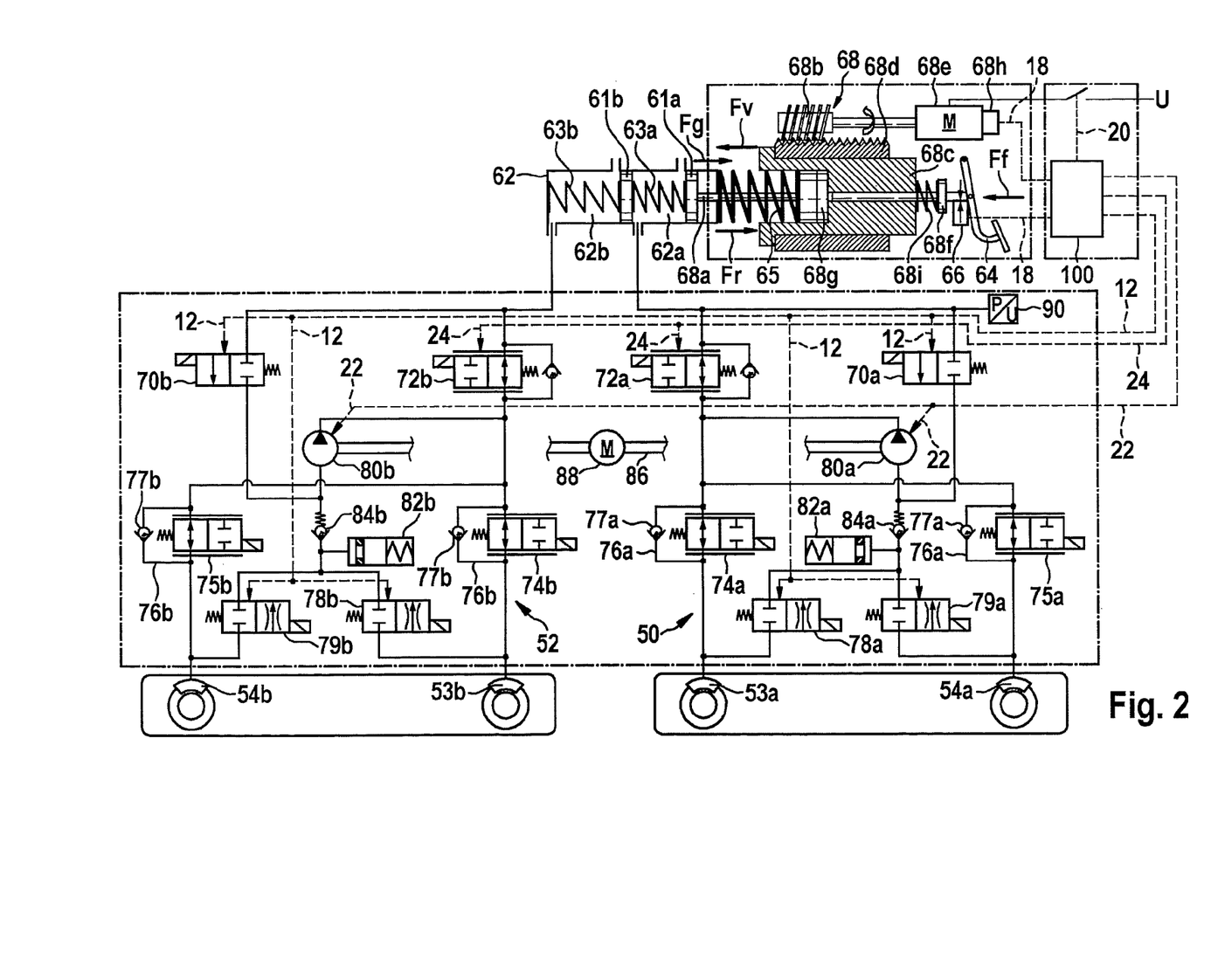
FIG. 2 schematically depicts an embodiment of the regenerative braking system.

FIG. 2 schematically depicts an embodiment of the regenerative braking system.

The braking system schematically reproduced in FIG. 2 is advantageously usable, for example, in a hybrid vehicle and in an electric vehicle. The usability of the braking system described hereinafter is not limited, however, to utilization in a hybrid vehicle or electric vehicle.

The braking system has a first brake circuit 50 having a first wheel brake cylinder 53a and a second wheel brake cylinder 54a. Optionally, the braking system also has a second brake circuit 52 having a third wheel brake cylinder 53b and a fourth wheel brake cylinder 54b. Preferably the braking system is designed with two brake circuits 50 and 52 for a vehicle having an X-type brake circuit configuration. In this case first wheel brake cylinder 53a and third wheel brake cylinder 53b are associated with a first vehicle axle, while second wheel brake cylinder 54a and fourth wheel brake cylinder 54b are associated with another vehicle axle. For example, first wheel brake cylinder 53a and third wheel brake cylinder 53b can be associated with the front axle, while second wheel brake cylinder 54a and fourth wheel brake cylinder 54b are associated with the rear axle. The wheels associated with a brake circuit 50 and 52 can be disposed in particular diagonally on the vehicle. The braking system described hereinafter is not limited, however to an X-type brake circuit configuration. The braking system is instead also usable when the wheels associated with one shared brake circuit 50 or 52 are disposed axle by axle, or on one side of the vehicle.

The braking system has a brake master cylinder 62 that can be embodied, for example, as a tandem brake master cylinder. Brake master cylinder 62 can have at least one movable piston 61a and 61b that is movable at least partly into at least one pressure chamber 62a or 62b of brake master cylinder 62. Brake master cylinder 62 preferably encompasses a first movable piston 61a, which can be referred to as a "plunger piston," that projects at least partly into a first pressure chamber 62a, associated with first brake circuit 50, of brake master cylinder 62, and a second movable piston 61b, which can be referred to as a "float piston," that projects at least partly into a second pressure chamber 62b, associated with second brake circuit 52, of brake master cylinder 62. In a preferred embodiment the float piston is movable so that upon movement of the float piston in a first direction, the first internal volume of first pressure chamber 62a decreases while the internal volume of second pressure chamber 62b increases. Correspondingly, by way of a movement of the float piston in a second direction, the internal volume of first pressure chamber 62a can increase, with a decrease in the internal volume of second pressure chamber 62b. The braking system is not limited, however, to the use of a tandem brake master cylinder or to a specific embodiment of brake master cylinder 62. Brake master cylinder 62 can be connected to a brake fluid reservoir (not depicted) via at least one brake fluid exchange opening, for example a breather orifice.

The braking system preferably has a brake actuation element 64, for example a brake pedal, disposed on a brake master cylinder 62. Advantageously, brake actuation element 64 is disposed on brake master cylinder 62 in such a way that upon an actuation of brake actuation element 64 with at least a threshold intensity, a driver braking force Ff applied onto brake actuation element 64 is transferable to the at least one movable piston 61a and 61b, for example to the plunger piston and float piston, in such a way that piston 61a and 61b is movable by driver braking force Ff. Preferably an internal pressure in at least one pressure chamber 62a and 62b of brake master cylinder 62 is increased by this movement of the piston. The movement of the at least one piston 61a and 61b can be counteracted by a brake master cylinder counterforce Fg that results from an internal pressure and/or at least one spring 63a and 63b in the at least one pressure chamber 62a and 62b. A return force Fr of a return spring 65 can also be directed against the movement of the at least one piston 61a and 61b.

Preferably the braking system also encompasses at least one brake actuation element sensor 66 with which the actuation intensity of the actuation of brake actuation element 64 by the driver can be ascertained. Brake actuation element sensor 66 can encompass, for example, a pedal travel sensor, a differential travel sensor, and/or a plunger travel sensor. A sensor system of a different type is, however, also usable, instead of or addition to the sensor types listed here, in order to sense the actuation intensity that corresponds to the driver's braking request.

The braking system depicted also has a brake booster 68, preferably an electromechanical brake booster 68. Brake booster 68 can be, in particular a brake booster capable of continuous closed-loop or open-loop control. An electromechanical brake booster 68 is notable for a variable boost. The electromechanical brake booster 68 can thus, in contrast to a conventional vacuum brake booster, be modified in terms of its properties (by way of control apparatus 100 described in more detail below). It is thus possible by way of an electromechanical brake booster 68 to influence in simple fashion the brake actuation force perceptible by the driver during a braking operation. Instead of an electromechanical brake booster 68, the braking system can also have a brake booster 68 of a different type. It is sufficient that by way of brake booster 68, a booster force Fv that can be varied by way of control apparatus 100 be transferable together with driver braking force Ff to the at least one piston 61a and 61b.

As depicted in FIG. 2, several forces therefore act on an output plunger 68a of an (electromechanical) brake booster 68, and correspondingly on brake actuation element 64. While driver braking force Ff and booster force Fv of the brake booster push output plunger 68a toward brake master cylinder 62, return force Fr of return spring 65 and brake master cylinder counterforce Fg act against the brake application motion of output plunger 68a. Another way to describe this is that booster force Fv assists the driver upon actuation of brake actuation element 64, while return force Fr of return spring 65 attempts to ensure that the mechanisms of brake booster 68 and of brake actuation element 64 return to their original positions after brake actuation, and brake master cylinder counterforce Fg works against the driver's brake application motion. When forces Ff, Fv, Fr, and Fg are in equilibrium, output plunger 68a and brake actuation element 64 then do not move. (This state exists as a rule provided the driver's braking request remains constant.)

The embodiment reproduced in FIG. 2 of the mechanism of brake booster 68, with a motor 68e that is in engagement via a linkage 68b with a booster body 68c (having a threaded surface 68d), such that booster body 68c acts, together with an input piston 68f transferring driver braking force Ff, on a reaction disk 68g that contacts output plunger 68a, is to be interpreted merely as an example. The fact that motor 68e is equipped with a sensor 68h, for example a rotation angle sensor, is also optional. In addition, input plunger 68f can be braced against booster body 68c via a further spring 68i.

Further components of the embodiment of the braking system will be described below with reference to FIG. 2. It is expressly noted that the components of the braking system which are described below represent merely one example of one possible embodiment of the advantageous braking system. A principal advantage of the braking system is that brake circuits 50 and 52 are not predefined as to a specific embodiment or to the use of specific components. Brake circuits 50 and 52 can instead be modified with a wide freedom of choice without negatively affecting the advantages of the embodiment of the braking system.

Each of brake circuits 50 and 52 is embodied with a high-pressure switching valve 70a and 70b and a switchover valve 72a and 72b, in such a way that the driver can apply braking via brake master cylinder 62 directly into wheel brake cylinders 53a, 53b, 54a, and 54b. In first brake circuit 50, a first wheel inlet valve 74a is associated with first wheel brake cylinder 53a and a second wheel inlet valve 75a with second wheel brake cylinder 54a, respectively with a bypass conduit 76a extending parallel thereto and a check valve 77a disposed in each bypass conduit 76a. In addition, a first wheel outlet valve 78a is associated with first wheel brake cylinder 53a and a second wheel outlet valve 79a with second wheel brake cylinder 54a. Correspondingly, in second brake circuit 52 a third wheel inlet valve 74b can also be associated with third wheel brake cylinder 53b and a fourth wheel inlet valve 75b with third wheel brake cylinder 54b. A respective bypass conduit 76b having a check valve 77b disposed therein can extend parallel to each of the two wheel inlet valves 74b and 75b of second brake circuit 52. In addition, in second brake circuit 52 as well a third wheel outlet valve 78b can be associated with third wheel brake cylinder 53b and a fourth wheel outlet valve 79b with fourth wheel brake cylinder 54b.

Each of brake circuits 50 and 52 furthermore encompasses a pump 80a and 80b, the intake side of which is connected to wheel outlet valves 78a and 79a or 78b and 79b, and the discharge side of which is directed toward the associated switchover valve 72a or 72b. Brake circuits 50 and 52 likewise have a reservoir chamber 82a or 82b (e.g. a low-pressure reservoir and/or a reservoir chamber) disposed between wheel outlet valves 78a and 79a or 78b and 79b and pump 80a or 80b, and a pressure relief valve 84a or 84b located between pump 80a or 80b and reservoir chamber 82a or 82b.

Pumps 80a and 80b can be disposed on one shared shaft 86 of a motor 88. Each of pumps 80a and 80b can be embodied as a single-piston pump. Instead of a single-piston pump, however, a different pump can also be used for at least one of pumps 80a and 80b. Differently embodied modulation systems, for example pumps having several or fewer pistons, asymmetrical pumps, or gear pumps, are likewise usable.

The braking system can thus be embodied as a modified standard modulation system, in particular as a dual-piston ESP system. In addition, each of the two brake circuits 50 and 52 can also encompass at least one pressure sensor 90, in particular on a supply conduit to a first wheel brake cylinder 53a and/or third wheel brake cylinder 53b used as a front-axle brake caliper.

The braking system interacting with a generator (not depicted) is furthermore equipped with control apparatus 100 already described above. Thanks to the control applied, as already described above, to the at least one wheel outlet valve 78a, 78b, 79a, 79b or to the at least one high-pressure switching valve 70a and 70b (omitting the at least one check valve 84a and 84b) by way of the at least one valve control application signal 12, the hydraulic braking torque of the braking system can be reduced in the context of an increasing generator braking torque. Correspondingly, by application of control to the at least one pump 80a and 80b by way of the at least one pump control signal 22, the hydraulic braking torque can be increased in such a way that despite a decrease over time in the generator braking torque, the driver braking request or total target braking torque can reliably be complied with. Regenerative braking is notable for the fact that a non-constant but known generator braking torque of the generator acts on the vehicle. By way of the known driver's braking request and the generator braking torque, a coordinator can calculate the hydraulic braking torque required in order to comply with the total target braking torque. If the presently available generator braking torque is sufficient to completely implement the driver's braking request, then braking can occur exclusively regeneratively using the braking system presented here. If the driver's braking request is greater than the instantaneously available generator braking torque, then by way of the braking torque present here, a hydraulic braking torque can be built up in addition to the generator braking torque, the sum of the generator braking torque and the hydraulic braking torque preferably being equal to the driver's braking request or total target braking torque. If a generator braking torque is not activated, for example because the at least one vehicle battery is completely charged and/or because a present vehicle speed is below a minimum generator utilization speed, then exclusively hydraulic braking can also be carried out by way of the braking system presented here. The manner of operation of the braking system is thus adaptable to an instantaneous usability of the generator in such a way that, simultaneously with rapid charging of the vehicle battery in order to reduce the energy consumption and pollutant emissions of the vehicle equipped with the braking system, the driver's braking request/total target braking torque can be reliably complied with.

In the context of exclusively regenerative braking or partly regenerative braking, i.e. with a generator braking torque not equal to zero, a brake pressure that is reduced as compared with driver braking force Ff is present in the braking system because of the displacement of brake fluid via the at least one valve 78a, 78b, 79a, 79b, 70a, and/or 70b to which control is applied via valve control signal 12. As a result, a brake master cylinder pressure and the brake master cylinder counterpressure Fg are also below their comparison values corresponding to driver braking force Ff (for a generator braking torque equal to zero). The reduction in brake master cylinder counterforce Fg (as a result of the displacement of brake fluid via the at least one valve 78a, 78b, 79a, 79b, 70a, and/or 70b to which control is applied via valve control signal 12) conventionally has a negative effect on the equilibrium of forces Ff, Fv, Fr, and Fg. In a braking system according to the existing art, this driver senses this change in the brake master cylinder counterforce during the actuation of brake actuation element 64 as a jitter, a recoil, a vibration, and/or a backward shift of brake actuation element 64.

As a result of the application of control to brake booster 68 by way of brake booster control signal 20 outputted from control apparatus 100, however, booster force Fv can be adapted to the change in brake master cylinder counterforce Fg. It is thus possible to prevent the driver from sensing feedback from the volume of brake fluid displaced via the at least one valve 78a, 78b, 79a, 79b, 70a, and/or 70b to which control is applied via valve control signal 12. Another way to describe this is that a varying brake master cylinder counterforce Fg is reacted to with an adapted booster force Fv in order to obtain an equilibrium of forces Ff, Fv, Fr, and Fg. Feedback into brake actuation element 64 can thereby be reliably prevented. (This function is expressed above using the term "force blending.")

Be it noted that the force blending functionality of the braking system described here is not limited to the jump-in region (of, for example, a vacuum booster). The deceleration range usable for regenerative braking is thus significantly expanded.

For example, control can be applied to a power supply U of brake booster 68 by way of brake booster control signal 20. The control apparatus can also output closing signal 24 (already described above) during operation of the at least one pump 80a and 80b. In addition, control apparatus 100 can additionally be designed to take into account, during application of control to brake booster 68, a sensor signal or information signal 18 of at least one sensor 66 and/or 68h. Advantageous control quality is thereby ensured.

Despite its plurality of functions that can be performed, the braking system described here has only one (electromechanical) brake booster 68 and one (modified) standard ESP modulation system. An additional actuator can be omitted. Because of the small number of components of the braking system which are involved in blending the generator braking torque and in subsequently adapting booster force Fv, the braking system has a significantly reduced complexity. This reduces the cost of the braking system. This reduces the cost of the braking system. In addition, because of its comparatively simple configuration the braking system can easily be installed in a vehicle. It also requires relatively little installation space.

In the braking system depicted, active pressure buildups, i.e. braking requests with no actuation of brake actuation element 64, can occur via the at least one pump 80a and 80b and the opened high-pressure switching valves 70a and 70b and closed wheel outlet valves 78a, 78b, 79a, and 79b. In addition, active pressure buildups of this kind can also occur by way of the (electromechanical) brake booster 68. (The desired pressure buildup dynamics, noise generation, and brake actuation feel can decide as to the actuator with which the pressure buildup is executed.)

In the event of a failure of the modulation system, the braking system still possesses a boosted braking function at all the wheel brake cylinders 53a, 54a, 54a, and 54b, and thus exhibits no additional functional limitations as compared with a conventional system. In the event of a failure of the (electromechanical) brake booster 68, the driver can be assisted in his or her actuation of the brake actuation element by the modulation system (by way of the at least one pump 80a and 80b). In this failure instance as well, the functional limitation does not differ from a conventional braking system having a brake booster 68, for example a vacuum brake booster.

Figure 3:
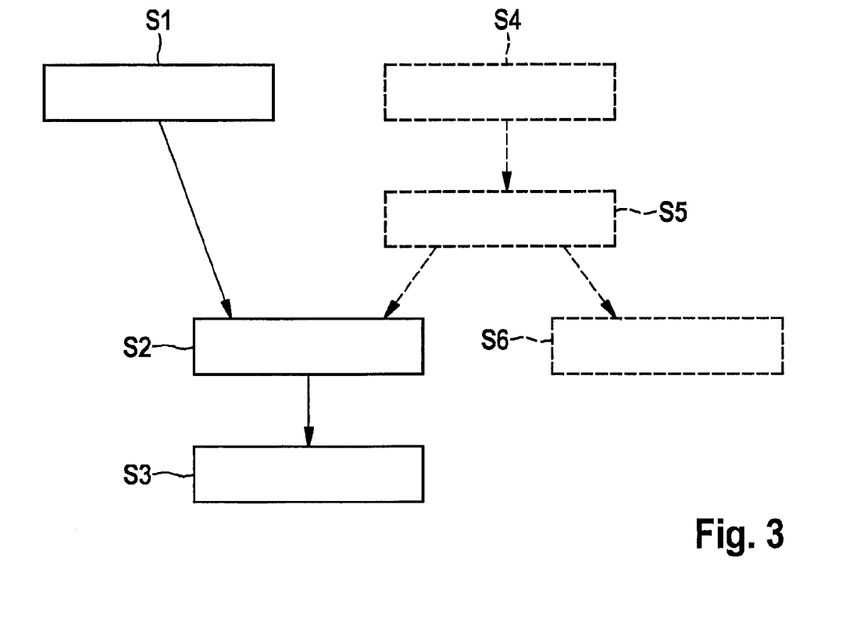
FIG. 3 is a flow chart to depict a first embodiment of the method for operating a regenerative braking system.

FIG. 3 is a flow chart to depict a first embodiment of the method for operating a regenerative braking system.

A regenerative braking system, in particular of a hybrid or electric vehicle, can be operated by way of the method described below. For example, the embodiments described above of the control apparatus and of the regenerative braking system can be operated by way of the method described here. It is noted, however, that the implementability of the method described below is not confined to the use of these embodiments or to a specific design of the braking system operated therewith.

In a method step S1 at least one valve of a brake circuit of the braking system has control applied to it, before and/or during operation of a generator of the braking system, so that brake fluid is displaced via the at least partly opened at least one valve from a brake master cylinder of the braking system and/or from the at least one brake circuit into at least one reservoir volume of the respective brake circuit. As a result of the displacement of brake fluid via the at least partly opened at least one valve, a buildup of brake pressure in the at least one brake circuit and/or in at least one wheel brake cylinder (e.g. a wheel brake caliper) connected thereto can be prevented despite an actuation of a brake actuation element disposed on the brake master cylinder. It is thus possible to prevent a hydraulic braking torque from being exerted on at least one of the wheels by way of the at least one wheel brake cylinder despite the actuation of the brake actuation element, for example a brake pedal, disposed on the brake master cylinder. The absence of braking action of the at least one wheel brake cylinder can thus be used for an advantageously high regeneration efficiency without exceeding a total target vehicle deceleration specified by the driver.

For example, in step S1 at least one wheel outlet valve or at least one high-pressure switching valve, constituting the at least one valve, can be at least partly opened. In particular, the brake fluid can be displaced, via the at least partly opened at least one wheel outlet valve or the at least partly opened at least one high-pressure switching valve, into a reservoir chamber constituting the at least one reservoir volume. The at least one reservoir chamber is preferably a low-pressure reservoir chamber. If the brake fluid is displaced via the at least partly opened at least one high-pressure switching valve, this occurs additionally via at least one check-valve-free conduit device between the respective high-pressure switching valve and the associated reservoir volume. Components of the braking system that are conventionally already present in a standard braking system can thus be used to carry out method step S1. It is thus possible to execute method step S1 even in the context of an economical braking system that requires little installation space.

Displacement of the brake fluid via the at least one high-pressure switching valve is additionally associated with the advantage that even a comparatively small buildup of brake pressure in the at least one wheel brake cylinder is omitted. Even a brake pressure of (almost) zero can thus be established or maintained in the at least one wheel brake cylinder thanks to the displacement of brake fluid via the at least one high-pressure switching valve.

The method also has a method step S2 in which a target force difference variable regarding a booster force exerted by a brake booster is defined in consideration of a generator braking torque information item regarding a generator braking torque exerted by the generator, of a measured or estimated brake master cylinder pressure variable, and/or of an evaluation variable derived from at least the generator braking torque information item or the brake master cylinder pressure variable. In method step S3 control is then applied to the brake booster in consideration of the defined target force difference variable. The booster force can in this fashion be varied by an amount equal to the actual force difference corresponding to the target force difference variable. For example, in the context of an increase or rise over time in the generator braking torque, in addition to the reduction in hydraulic braking torque the booster force can also be reduced in such a way that a reduction in the brake master cylinder counterforce is (at least partly) compensated for by the displacement of brake fluid into the at least one reservoir volume.

The target force difference variable is preferably defined at least in consideration of the generator braking torque (or of a hydraulic braking torque increased or reduced by an amount equal to the change in the generator braking torque), and of a braking torque/counterforce characteristic curve of the braking system referring to a ratio between a hydraulic braking torque of the braking system and a brake master cylinder counterforce, brought about thereby, on a brake actuation element disposed on a brake master cylinder of the braking system. As an alternative or supplement thereto, the target force difference variable can be defined in consideration of the measured brake master cylinder pressure variable and a brake master cylinder pressure/counterforce characteristic curve of the braking system referring to a ratio between a brake master cylinder pressure and the brake master cylinder counterforce, brought about thereby, on the brake actuation element. An advantageously large number of possibilities for reliably defining the target force difference variable thus exists.

It is noted in particular that a brake master cylinder pressure sensor apparatus (conventionally already present) for ascertaining a presently existing brake master cylinder pressure can also be resorted to in order to define the target force difference variable (based on the combination with a preferably modified standard modulation system). Complex and error-prone estimation of the brake master cylinder pressure is not necessary here. This increases the control quality when adapting the booster force in method step S3.

The method preferably also has a method step S4 in which a generator braking torque of the generator, reduced because of a reduction instruction to the generator being operated or because of a deactivation of the generator, is blended. The blending occurs in method step S4 by pumping brake fluid, using at least one pump of the respective brake circuit, out of the at least one reservoir volume into at least one wheel brake cylinder of the braking system. Using method step S4 it is thus possible to increase the hydraulic braking torque in such a way that the driver's braking request or total target braking torque is reliably complied with despite the reduced generator braking torque.

In method step S4, for example, a target pump capacity variable of the at least one pump of the braking system can be defined in consideration of the reduced generator braking torque. Control can then be applied to the at least one pump in consideration of the defined target pump capacity variable. As an alternative, the at least one pump can also be operated until a predefined brake pressure and/or a desired hydraulic braking torque is achieved.

After method step S4, method steps S2 and S3 can be executed again. By way of method steps S2 and S3, the booster force can be increased, by an amount equal to an actual force difference corresponding to the target force difference variable, in such a way that despite the increase in brake master cylinder pressure due to return delivery, and therefore the increase in brake master cylinder counterforce, the desired force equilibrium prevails.

Advantageously, together with method step S4 a method step S5 can also be executed in which during operation of the at least one pump, at least one switchover valve of the braking system is controlled into a closed state. A recoil or feedback of the return delivery, and the pump pulses applied for that purpose to the brake actuation element, can thereby be prevented. Despite the closure of the at least one switchover valve, the driver can still increase the driver's braking request or total target braking torque. This is ensured because in this case volume can flow via the check valve of the switchover valve into the associated brake circuit. Once the return delivery has been accomplished, i.e. after operation of the at least one pump for pumping brake fluid out of the at least one reservoir volume into the at least one wheel brake cylinder has ended, the continuously adjustable switchover valve can be slowly opened in order to compensate for any pressure differences (method step S6). The compensation for pressure differences can be accomplished additionally in consideration of the continuously measured brake master cylinder pressure.

FIGS. 4a to 4e show five coordinate systems for depicting a second embodiment of the method for operating a regenerative braking system.

For better clarity, the method is described using the regenerative braking system discussed above, the first wheel brake cylinder and the third wheel brake cylinder being associated with a first axle embodied as a front axle, and the second wheel brake cylinder and the fourth wheel brake cylinder being associated with a second axle embodied as a rear axle. The range of embodiment of the method is not limited, however, to the use of the above-described braking system or to this allocation of the wheel brake cylinders.

Figure 4A:
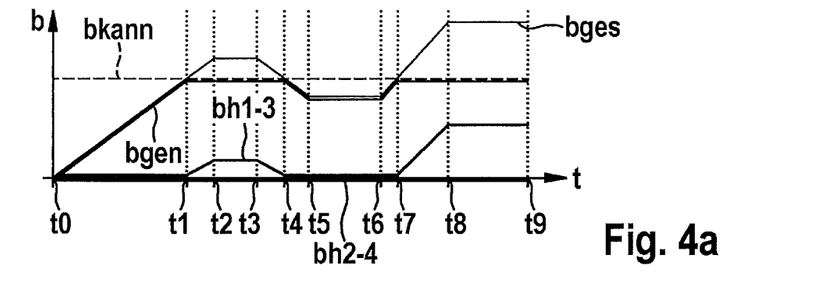
FIGS. 4a to 4e show five coordinate systems for depicting a second embodiment of the method for operating a regenerative braking system.
Figure 4B:
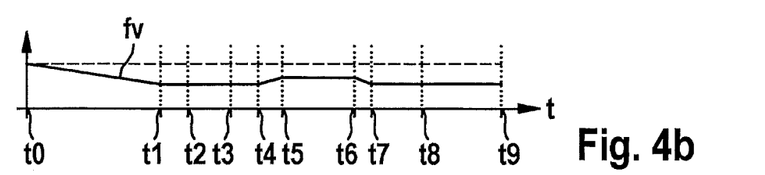
Figure 4C:
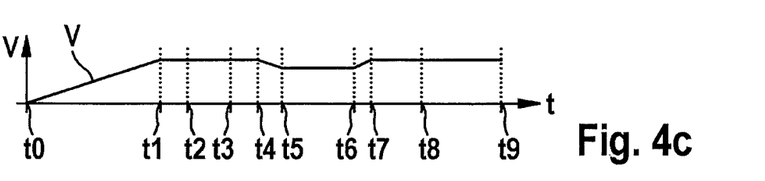
Figure 4D:
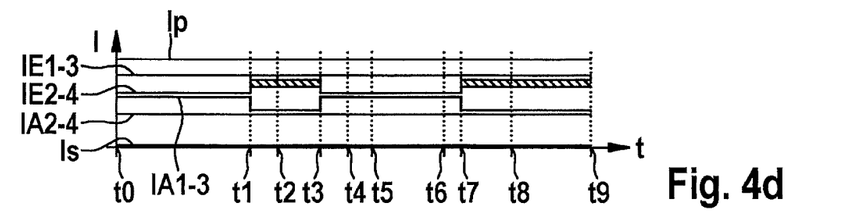
Figure 4E:
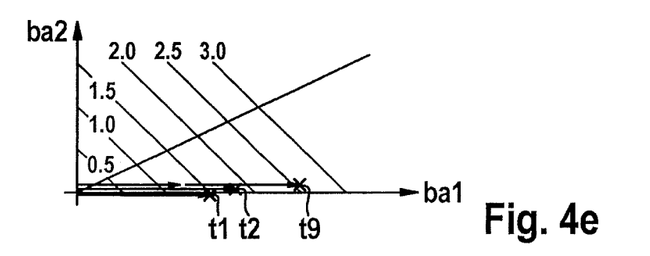

In the coordinate systems of FIGS. 4a to 4d, the abscissa is the time axis t. The ordinate of the coordinate system of FIG. 4a reproduces a braking torque b, while the ordinate of FIG. 4b indicates a numerical value, the ordinate of FIG. 4c corresponds to a displaced volume V of brake fluid, and the ordinate of the coordinate system of FIG. 4d indicates a current intensity I. The abscissa of the coordinate system of FIG. 43 is a first axle braking torque ba1 exerted on the first axle, while the ordinate of the coordinate system of FIG. 4e represents an axle braking torque ba2 exerted on the second axis.

Until a time t0, the brake actuation element of the braking system operated by way of the method is in its initial position or non-actuation position. Until time t0 the driver is thus exerting no force on the brake actuation element.

Starting at time t0, the driver exerts an increasing force on the brake actuation element, with the result that the latter is moved. Between times t0 and t1 the entire driver's braking request can be executed exclusively regeneratively. This is possible because the total target braking torque bges requested by the driver between times t0 and t1 is below the maximally implementable generator-producible braking torque bkann. Between times t0 and t1 the generator braking torque bgen can thus be established in accordance with the total target braking torque bges.

For exclusively regenerative braking between times t0 and t1, the wheel outlet valves are opened with the result that the volume of brake fluid displaced by the driver out of the brake master cylinder is discharged (almost) entirely into the reservoir chambers (e.g. low-pressure reservoir chambers) (method step S1). The volume V in the at least one reservoir chamber correspondingly increases between times t0 and t1. The result is that no hydraulic brake pressure is built up, and a first hydraulic braking torque portion bh1-3 of the first wheel brake cylinder and the third wheel brake cylinder, and a second hydraulic braking force portion bh2-4 of the second wheel brake cylinder and the fourth wheel brake cylinder, remain equal to zero between times t0 and t1.

For blending as described above, the four wheel inlet valves and the four wheel outlet valves are each controlled into an open state between times t0 and t1. With an embodiment of the wheel inlet valves as zero-current-open valves and an embodiment of the wheel outlet valves as zero-current-closed valves, this is accomplished by a first valve control signal IE1-3 having a current intensity equal to zero which is outputted to the first wheel inlet valve and the third wheel valve; a second valve control signal IE2-4 having a current intensity equal to zero which is outputted to the second wheel inlet valve and the fourth wheel inlet valve; a third valve control signal IA1-3 having a current intensity not equal to zero (e.g. equal to one) which is sent to the first wheel outlet valve and the third wheel outlet valve; and a fourth valve control signal IA2-4 having a current intensity not equal to zero (e.g. equal to one) which is furnished to the second wheel outlet valve and the fourth wheel outlet valve. (Between times t0 and t1, the pump control signal lp and the closing signal is are kept equal to zero.)

In addition, between times t0 and t1 the magnitude of the shortfall in pressure buildup, and thus of the shortfall in brake master cylinder counterforce, at the (electromagnetic) brake booster is ascertained by way of a brake master cylinder pressure sensor. A desired equilibrium, corresponding to the volume V displaced into the at least one reservoir chamber, between booster force Fv and brake master cylinder counterforce Fg can be maintained by way of the reduction, depicted in FIG. 4b in the boost factor fv, booster force Fv being correlated with a product of boost factor fv and a driver braking force (not depicted) (method steps S2 and S3). A standard brake actuation feel can thus be ensured for the driver despite the increasing displaced volume V.

Between times t1 and t4, the total target braking torque bges requested by the driver is greater than the maximally implementable generator-producible braking torque bkann. By closure of the first wheel outlet valve and the third wheel outlet valve, however, a first hydraulic braking torque portion bh1-3 not equal to zero can be built up in the first wheel brake cylinder and in the third wheel brake cylinder. (Closure of the first and the third wheel outlet valve is accomplished using a third valve closing signal IA1-3 equal to zero.) Another way to describe this is that the volume additionally displaced by the driver in the context of the increase in braking request is conveyed into the first and the third wheel brake cylinder (of the front axis). By delta-p regulation (Δp regulation) of the (preferably continuously adjustable) second and fourth wheel inlet valves (second valve control signal IE2-4 between zero and one), pressure regulation can be carried out in each brake circuit in such a way that a sum of the first hydraulic braking torque portion bh1-3 and the generator braking torque bgen corresponds to the total target braking torque bges.

The hydraulic brake pressure in the front axle wheel brake cylinders also results in an increase in the brake master cylinder counterforce (not equal to zero). A further reduction in the booster force is thus not necessary. The boost factor fv can thus be kept constant during times t1 to t4. Another way to describe this is that the regulation of the boost force or boost factor fv ensures that the sum of the return spring force and the brake master cylinder counterforce is compensated for by the booster force so as to result in the driver braking force expected by the driver for that actuation travel.

At time t2 the driver braking request or total target braking force bges reaches a local maximum. Starting at time t3 the driver reduces the driver's braking request or total target braking torque bges. Between times t3 and t4 firstly the first hydraulic braking torque bh1-3 portion is reduced. For this, volume is merely taken from the first wheel brake cylinder and the third wheel brake cylinder, by opening the first wheel outlet valve and the third wheel outlet valve. The first and the third wheel outlet valve are opened by way of a third valve control signal IA1-3 not equal to zero (e.g. equal to one). Starting at time t4 or starting from a first hydraulic braking torque portion bh1-3 equal to zero, the reduction in the total target braking torque bges can be effected via a reduction in the generator braking torque bgen. This occurs until the driver braking request or total target braking torque bges reaches a local minimum at time t5.

Starting at time t6, the driver braking request or total target braking torque bges increases again, and starting at time t7 once again exceeds the maximally implementable generator-producible braking torque bkann. (Between times t4 and t7, control can be applied to the wheel inlet valves and wheel outlet valves as it was between times t0 and t1.) Starting at time t7 the method steps executed between times t1 and t4 are repeated. The description of these method steps will not be repeated.

FIGS. 5a to 5e show five coordinate systems for depicting a third embodiment of the method for operating a regenerative braking system. (The abscissas and ordinates of the coordinate systems of FIGS. 5a to 5e correspond to FIGS. 4a to 4e.)

Until a time t10, the brake actuation element of the braking system operated by way of the method is in its initial position or non-actuation position. Between times t10 and t13 the driver requests a total target braking torque bges that is less than or equal to a maximally implementable generator-producible braking torque. (The total target braking torque bges to be implemented between times t10 and t13 reaches a maximum at time t11 and remains constant between times t11 and t13.) The driver's braking request is thus usable in order to charge a vehicle battery. For this, by opening all four wheel inlet valves (by way of a first valve control signal 1E1-3 equal to zero and a second valve control signal 1E2-4 equal to zero), and by opening all four wheel outlet valves (by way of a third valve control signal IA1-3 not equal to zero and a fourth valve control signal IA2-4 not equal to zero), the first hydraulic braking torque portion bh1-3 of the first and the third wheel cylinder and the second hydraulic braking torque portion bh2-4 of the second and the fourth wheel brake cylinder are held equal to zero between times t10 and t13 despite the actuation of the brake actuation element (method step S1). Between times t10 and t13 the generator braking torque bgen is furthermore set to be equal to the total target braking torque bges, and the booster force or boost factor fv is adapted to the volume V displaced into the at least one reservoir volume (method steps S2 and S3). This ensures the advantages already described above.

Figure 5A:
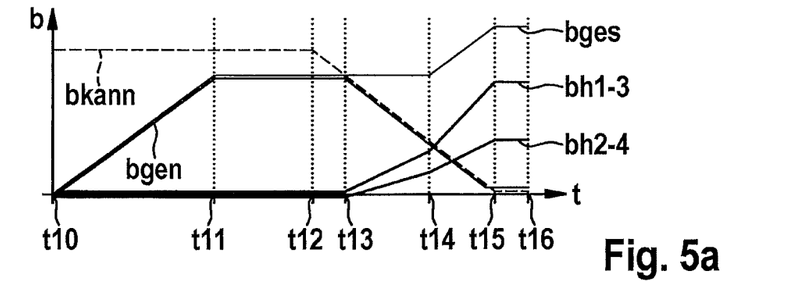
FIGS. 5a to 5e show five coordinate systems for depicting a third embodiment of the method for operating a regenerative braking system.
Figure 5B:
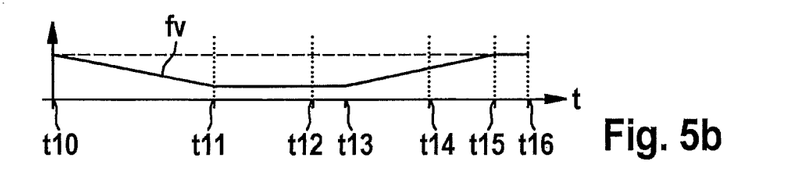
Figure 5C:
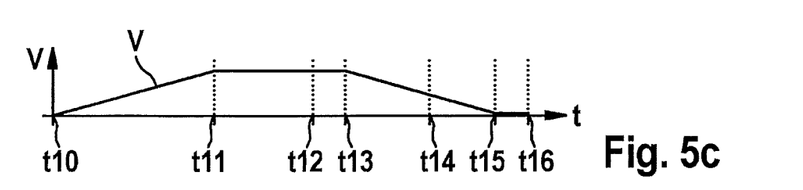
Figure 5D:
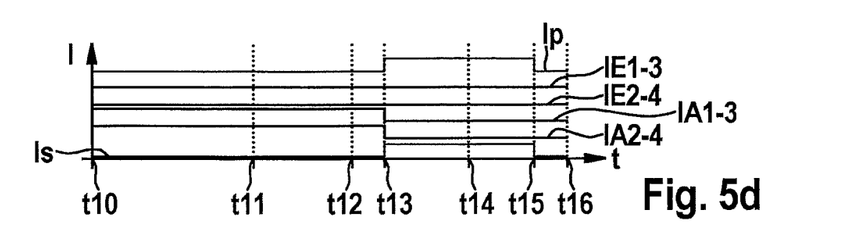
Figure 5E:
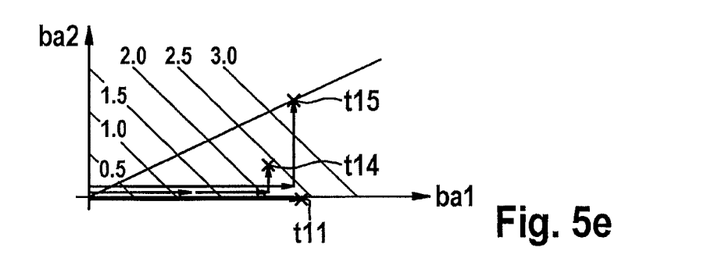
Figure 6A:
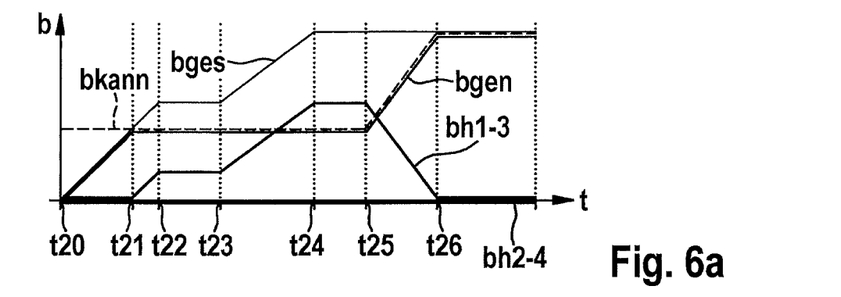
FIGS. 6a to 6e show five coordinate systems for depicting a fourth embodiment of the method for operating a regenerative braking system.
Figure 6B:
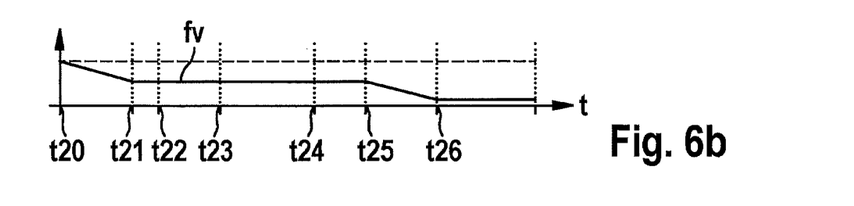
Figure 6C:
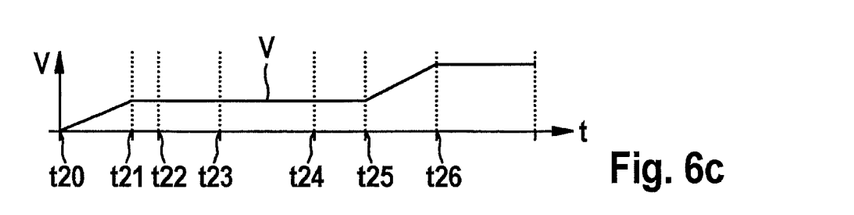
Figure 6D:
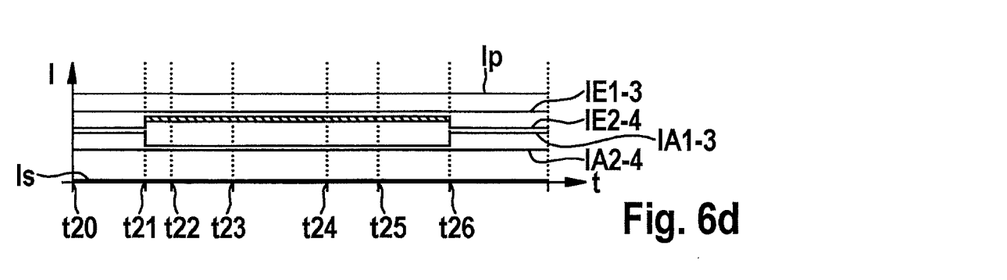
Figure 6E:
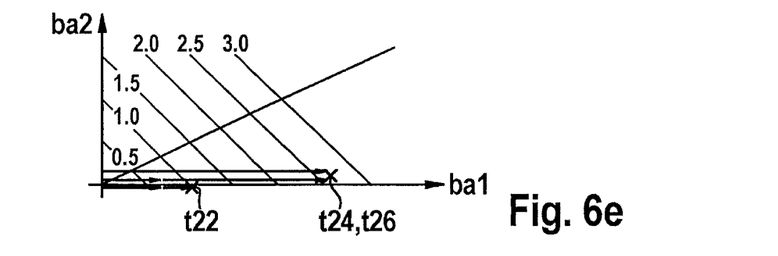

Starting at time t12 the maximally implementable generator-producible braking torque bkann decreases, for example because of a charged state of the vehicle battery and/or due to a reduction in the present speed of the vehicle below a minimum generator utilization speed. After time t13 the maximally implementable generator-producible braking torque is lower than the driver's braking request or total target braking torque bges. The driver's torque request can nevertheless be reliably complied with by building up a brake pressure in the wheel brake cylinders. For this, all four wheel outlet valves are closed starting at time t13 by way of a third valve control signal IA1-3 equal to zero and a fourth valve control signal IA2-4 equal to zero. By way of a pump control signal 1p not equal to zero, the at least one pump of the braking system can be activated starting at time t13 in such a way that brake fluid is pumped out of the reservoir volume into the wheel brake cylinders (method step S4). The volume V present in the reservoir volume therefore decreases starting at time t13. It is thereby possible to build up at both the front and the rear axle a hydraulic brake torque such that the total target braking torque bges is reliably complied with.

In order to avoid the perceptible pump pulsations at the brake actuation element caused by the return delivery, the at least one switchover valve is closed for the return delivery time by way of a closing signal ls (method step S5). If the at least one switchover valve is embodied as a zero-current-open valve, this is accomplished by way of a closing signal ls not equal to zero.

Despite the closing of the at least one switchover valve during return delivery or during operation of the at least one pump, the driver can still increase the total target braking torque starting at time t14. In this case volume flows via the check valve of the switchover valve into the brake circuit. It is noted that thanks to the operation of the pump even after time t14, the increased total target braking torque bges can still be implemented by a rise in the hydraulic braking torque portions bh1-3 and bh2-4, even though the maximally implementable generator-producible braking torque bkann continuously decreases and becomes equal to zero at time t15.

Even during the increase in the hydraulic braking torque portions bh1-3 and bh2-4 between times t13 and t15, the booster force or boost factor fv is adapted to the return delivery of the volume V displaced into the at least one reservoir volume (method steps S2 and S3).

At time t15 the return delivery is terminated. The at least one switchover valve (advantageously embodied as a continuously adjustable valve) can be slowly opened in order to compensate for any pressure differences (method step S6). After the completion of the return delivery of volume V from the at least one reservoir volume back into the at least one brake circuit, braking occurs exclusively hydraulically. The boost factor fv of the brake booster has returned to the conventional initial value.

FIGS. 6a to 6e show five coordinate systems for depicting a fourth embodiment of the method for operating a regenerative braking system. (The abscissas and ordinates of the coordinate systems of FIGS. 6a to 6e correspond to FIGS. 4a to 4e.)

Until a time t20 the brake actuation element of the braking system operated by way of the method is in its initial position or non-actuation position. Starting at time t20 the driver exerts an increasing force on the brake actuation element. Between times t20 and t21 braking can occur exclusively regeneratively in the manner already described above (method step S1). Starting at time t21, as a result of a driver-requested total target braking torque bges that is greater than the maximally implementable generator-producible braking torque bkann, a first hydraulic braking torque portion bh1-3 not equal to zero is built up in the first and the third wheel brake cylinder by closing the first and the third wheel outlet valve. The additional volume displacement by the driver by way of the actuation of the brake actuation element can be used to build up a desired hydraulic braking torque at the front axle. At the same time it is possible to ensure, by holding the second and the fourth wheel outlet valve open, that no brake pressure buildup occurs in the wheel brake cylinders of the rear axle. In particular, the brake pressure in the at least one brake circuit can be regulated to a desired value by way of a suitable application of control (delta-p regulation or $\Delta p$ regulation) to the (preferably continuously adjustable) second and fourth wheel inlet valves. In addition, the boost factor fv is adapted so that the desired force equilibrium exists despite the volume V displaced into the at least one reservoir volume (method steps S2 and S3).

In the embodiment of FIGS. 6a to 6e, the maximally implementable generator-producible braking torque increases during a braking operation at time t25. This can be used to increase the generator braking torque bgen for faster charging of the vehicle battery. Starting at time t25, brake fluid can flow into the at least one reservoir volume thanks to delta-p ($\Delta p$) regulation of the second and the fourth wheel inlet valve and by simultaneously holding the second and the fourth wheel outlet valve open, so that a volume V therein increases starting at time t25. At the same time, the second hydraulic braking torque portion bh2-4 of the second and the fourth wheel brake cylinder can be kept equal to (almost) zero. The hydraulic braking torque portion bh1-3 of the first and the third wheel brake cylinder can likewise be reduced between times t25 and t26 in such a way that the generator braking torque bgen corresponding to the increase in the maximally implementable generator-producible braking torque bkann can be raised, and at the same time the driver's braking request can be reliably complied with.

The booster force or boost factor fv of the brake booster is also adapted in this operating situation depending on the present brake actuation travel or present driver braking force, and on the brake master cylinder pressure that is in fact present. If pumping turns out to be advantageous during this phase in order to displace an additional volume into the first and the third wheel brake cylinder, the at least one switchover valve can be closed for the pump activation time and slowly opened thereafter (although this is not depicted in FIG. 6d). After completion of a displacement of brake fluid out of the first and the third wheel brake cylinder via the second and the fourth wheel inlet valve into the at least one reservoir volume, braking can occur entirely regeneratively.

What is claimed is:

1. A method for operating a regenerative braking system of a vehicle, comprising:
applying control to at least one valve of a brake circuit of the braking system to at least partly open the at least one valve at least one of before and during operation of a generator of the braking system, so that brake fluid is displaced via the at least one valve at least one of out of a brake master cylinder of the braking system and out of the at least one brake circuit into at least one reservoir volume of the brake circuit;
defining a target force difference variable regarding a booster force exerted by a brake booster, in consideration of at least one of (i) a generator braking torque information item regarding a generator braking torque exerted by the generator, (ii) a brake master cylinder pressure variable, and (iii) an evaluation variable derived from one of the generator braking torque information item or the brake master cylinder pressure variable; and
applying control to the brake booster in consideration of the defined target force difference variable in such a way that the booster force is varied by an amount equal to an actual force difference corresponding to the target force difference variable, wherein:
the booster force is applied in a direction of the brake master cylinder, and
the target force difference variable is determined such that as brake fluid is displaced into the at least one reservoir volume the booster force is correspondingly decreased, wherein the at least one valve at least partly opened is at least one wheel outlet valve so that brake fluid is displaced via the at least partly opened wheel outlet valve into the at least one reservoir volume;
pumping brake fluid upon at least one of:
(i) upon a reduction in the generator braking torque exerted by the generator, and
(ii) upon a deactivation of the generator, by way of at least one pump of the brake circuit out of the at least one reservoir volume into at least one wheel brake cylinder of the braking system;
controlling at least one switchover valve of the braking system into a closed state during operation of the at least one pump for pumping brake fluid out of the at least one reservoir volume into the at least one wheel brake cylinder; and
gradually controlling the at least one switchover valve into an at least partly open state after a termination of operation of the at least one pump for pumping brake fluid out of the at least one reservoir volume into the at least one wheel brake cylinder.

2. The method as recited in claim 1, wherein the at least one valve at least partly opened is at least one high-pressure switching valve so that brake fluid is displaced via the at least partly opened high-pressure switching valve and at least one check-valve-free conduit device located between the high-pressure switching valve and the at least one reservoir volume into the at least one reservoir volume.

3. The method as recited in claim 1, wherein brake fluid is displaced via the at least one valve into a low-pressure reservoir chamber constituting the at least one reservoir volume.

4. A control apparatus of a regenerative braking system of a vehicle, comprising:
a control application device including a processor configured to:
control at least one valve of a brake circuit of the braking system into an at least partly opened state at least one of before and during operation of a generator of the braking system so that brake fluid is displaceable via the at least one valve out of at least one of a brake master cylinder of the braking system and the at least one brake circuit into at least one reservoir volume of the brake circuit;
define a target force difference variable regarding a booster force exertable by a brake booster, in consideration of at least one of (i) a generator braking torque information item regarding a generator braking torque exerted or exertable by the generator, (ii) a brake master cylinder pressure variable, and (iii) an evaluation variable derived from one of the generator braking torque information item or the brake master cylinder pressure variable; and
output, in consideration of the defined target force difference variable, at least one brake booster control signal to the brake booster so that the booster force is varied by an amount equal to an actual force difference corresponding to the target force difference variable, wherein:
the booster force is applied in a direction of the brake master cylinder,
the target force difference variable is determined such that as brake fluid is displaced into the at least one reservoir volume the booster force is correspondingly decreased,
at least one pump of the brake circuit is controlled by the control application device at least one of (i) upon a reduction in the generator braking torque exerted by the generator and (ii) upon a deactivation of the generator, so that brake fluid is pumped by way of the at least one pump out of the at least one reservoir volume into at least one wheel brake cylinder of the braking system,
the control application device is additionally configured to output to at least one switchover valve of the brake circuit, during operation of the at least one pump that pumps brake fluid out of the at least one reservoir volume into the at least one wheel brake cylinder, at least one closing signal with which the at least one switchover valve is controllable into a closed state, and
the control application device is configured to gradually control the at least one switchover valve into an at least partly open state after a termination of operation of the at least one pump that pumps brake fluid out of the at least one reservoir volume into the at least one wheel brake cylinder.

5. The control apparatus recited in claim 4, wherein the at least one valve is at least one wheel outlet valve so that brake fluid is displaceable via the at least one wheel outlet valve which is at least partly opened into the at least one reservoir volume.

6. The control apparatus as recited in claim 4 wherein the at least one valve is at least one high-pressure switching valve so that brake fluid is displaceable into the at least one reservoir volume via the at least one high-pressure switching valve which is partly opened and at least one check-valve-free conduit device between the high-pressure switching valve and the reservoir volume.

7. A regenerative braking system of a vehicle, comprising:
a brake circuit; and
a control apparatus as recited in claim 4.

8. The regenerative braking system as recited in claim 7, wherein the at least one reservoir volume into which brake fluid is displaceable at least one of from the brake master cylinder and from the at least one brake circuit, via the at least one valve controllable by the control application device into the at least partly opened state, is at least one low-pressure reservoir chamber.

9. A method for operating a regenerative braking system of a vehicle, comprising:
applying control to at least one valve of a brake circuit of the braking system to at least partly open the at least one valve at least one of before and during operation of a generator of the braking system, so that brake fluid is displaced via the at least one valve at least one of out of a brake master cylinder of the braking system and out of the at least one brake circuit into at least one reservoir volume of the brake circuit;
defining a target force difference variable regarding a booster force exerted by a brake booster, in consideration of at least one of (i) a generator braking torque information item regarding a generator braking torque exerted by the generator, (ii) a brake master cylinder pressure variable, and (iii) an evaluation variable derived from one of the generator braking torque information item or the brake master cylinder pressure variable; and
applying control to the brake booster in consideration of the defined target force difference variable in such a way that the booster force is varied by an amount equal to an actual force difference corresponding to the target force difference variable, wherein:

the booster force is applied in a direction of the brake master cylinder, and the target force difference variable is determined such that as brake fluid is released from the at least one reservoir and supplied to at least one wheel brake cylinder of the brake circuit the booster force is correspondingly increased, wherein the at least one valve at least partly opened is at least one wheel outlet valve so that brake fluid is displaced via the at least partly opened wheel outlet valve into the at least one reservoir volume;

pumping brake fluid upon at least one of:
(i) upon a reduction in the generator braking torque exerted by the generator, and
(ii) upon a deactivation of the generator, by way of at least one pump of the brake circuit out of the at least one reservoir volume into at least one wheel brake cylinder of the braking system;

controlling, at least one switchover valve of the braking system, into a closed state during operation of the at least one pump for pumping brake fluid out of the at least one reservoir volume into the at least one wheel brake cylinder; and gradually controlling, the at least one switchover valve, into an at least partly open state after a termination of operation of the at least one pump for pumping brake fluid out of the at least one reservoir volume into the at least one wheel brake cylinder.

10. A control apparatus of a regenerative braking system of a vehicle, comprising:

a control application device including a processor configured to:

control at least one valve of a brake circuit of the braking system into an at least partly opened state at least one of before and during operation of a generator of the braking system so that brake fluid is displaceable via the at least one valve out of at least one of a brake master cylinder of the braking system and the at least one brake circuit into at least one reservoir volume of the brake circuit;

define a target force difference variable regarding a booster force exertable by a brake booster, in consideration of at least one of (i) a generator braking torque information item regarding a generator braking torque exerted or exertable by the generator, (ii) a brake master cylinder pressure variable, and (iii) an evaluation variable derived from one of the generator braking torque information item or the brake master cylinder pressure variable; and output, in consideration of the defined target force difference variable, at least one brake booster control signal to the brake booster so that the booster force is varied by an amount equal to an actual force difference corresponding to the target force difference variable, wherein:

the booster force is applied in a direction of the brake master cylinder, and the target force difference variable is determined such that as brake fluid is released from the at least one reservoir and supplied to at least one wheel brake cylinder of the brake circuit the booster force is correspondingly increased, at least one pump of the brake circuit is controlled by the control application device at least one of (i) upon a reduction in the generator braking torque exerted by the generator and (ii) upon a deactivation of the generator, so that brake fluid is pumped by way of the at least one pump out of the at least one reservoir volume into at least one wheel brake cylinder of the braking system, the control application device is additionally configured to output to at least one switchover valve of the brake circuit, during operation of the at least one pump that pumps brake fluid out of the at least one reservoir volume into the at least one wheel brake cylinder, at least one closing signal with which the at least one switchover valve is controllable into a closed state, and the control application device is configured to gradually control the at least one switchover valve into an at least partly open state after a termination of operation of the at least one pump that pumps brake fluid out of the at least one reservoir volume into the at least one wheel brake cylinder.

\* \* \* \* \*